Dec. 26, 1967  C. A. MURDOCH  3,359,979

PROJECTILE HYPODERMIC SYRINGES

Filed Nov. 12, 1964

3,359,979
PROJECTILE HYPODERMIC SYRINGES
Colin A. Murdoch, 14A Hassel St.,
Timaru, Canterbury, New Zealand
Filed Nov. 12, 1964, Ser. No. 410,376
Claims priority, application New Zealand, Apr. 28, 1964, 138,029
5 Claims. (Cl. 128—218)

ABSTRACT OF THE DISCLOSURE

A projectile for injecting liquid medicines, drugs and the like into animals in which a capsule is arranged for axial movement within a hollow body, a resilient movable piston in the capsule divides the capsule into anterior and posterior portions with a rupturable membrane closing the end of the anterior portion. A liquid medicine fills the anterior portion and actuating means within the posterior portion normally urges the piston towards the membranes. A hypodermic needle extends axially of the body and the actuating means maintains the anterior portion under pressure whereby upon entry of the needle into an animal with the momentum of the capsule causing the same to be displaced axially and forwardly of the body, the needle ruptures the membrane for providing communication between the anterior portion and the needle interior so that the actuating means then forces the piston towards the membrane for expelling the medicine through the needle.

---

This invention relates to projectile hypodermic syringes capable of administering a desired quantity of liquid medicine, drugs and the like to an animal situated at a distance from the administrator.

The projectile hypodermic syringe of this invention is adapted to perform a similar function as the projectile hypodermic syringe as described in my co-pending United States application Ser. No. 238,448, now Patent No. 3,207,157 and may be projected towards the animal to which the liquid medicine is to be administered by any suitable projecting device, such as, for example, that described in my co-pending United States patent application Ser. No. 238,412, now abandoned.

It is known in the art to provide projectile hypodermic syringes including a hollow body, a capsule containing a bladder to accommodate liquid medicines under pressure slidably accommodated within said body, a hollow needle secured axially of the body with one end of the needle being adapted to penetrate the animal to be dosed and the other end adapted to rupture the bladder on the forward movement of the capsule within the body to permit the egress of the liquid medicine through the needle for injection into said animals.

However, such a construction has substantial disadvantages, among them:

(1) Nonpositive expulsion of all the liquid medicament contained within the capsule.

(2) Difficulty in filling and sealing the bladder.

(3) Difficulty in inserting pregnant bladder into the capsule.

In projectile hypodermic syringes it is desirable and in fact essential that very accurate doses of the medicine be administered to the animal if the correct treatment is to be obtained. In such a construction as described above, once the bladder has been pierced it collapses to expel the contents thereof. However, it is apparent that unless very high gas pressures are used a variable but significant proportion of the medicine will not be expelled. If such high gas pressures are employed then in all probability the capsule will distort and distend and bind on the interior wall of the body of the projectile thus rendering the projectile inoperable.

It is therefore an object of this invention to provide a projectile hypodermic syringe which is capable of positively discharging all or substantially all the liquid medicine, drugs and the like from the projectile into the animal to be dosed.

It is a further object of this invention to provide a projectile hypodermic syringe capable of positively discharging all or substantially all the liquid medicine drugs and the like from the projectile into the animal which is of simple construction for ease of assembly and manufacture.

It is a further object of this invention to provide a projectile hypodermic syringe capable of positively discharging all or substantially all the liquid medicine, drugs and the like from the projectile into the animal, wherein the liquid medicine is contained within a capsule which in turn is contained within but separate from the body of the projectile so that the dose of said liquid medicine may be accurately measured and packed within said capsule prior to the preparation of the projectile for projection.

It is a further object of this invention to provide a projectile hypodermic syringe capable of positively discharging all or substantially all the liquid medicine from the projectile into the animal which will allow said capsule to be removed or changed for another should the need arise.

Accordingly, the projectile hypodermic syringe of this invention includes a hollow body, a hypodermic needle extending axially thereof so as to extend thereinto and project therefrom, a capsule arranged for accommodation in and capable of axial movement within the body, a piston of resilient material within said capsule capable of axial movement therein and dividing the capsule into anterior and posterior portions, a rupturable membrane closing the end of said anterior portion, said anterior portion being adapted to be filled with liquid medicine, actuating means within said posterior portion normally urging said piston in the direction of said membrane and maintaining said anterior portion under pressure such that upon penetration of the hollow needle into the animal, and the momentum of the capsule causing it to be displaced axially and forwardly of the body consequently causing the inwardly extending portion of the needle to penetrate and rupture the membrane to provide communication between said anterior portion and the interior of said needle, the actuating means then forcing said piston toward the membrane thus expelling the liquid contents of the anterior portion through the hollow needle.

The invention will now be further described with reference to the accompanying drawings in which.

Figure 1:
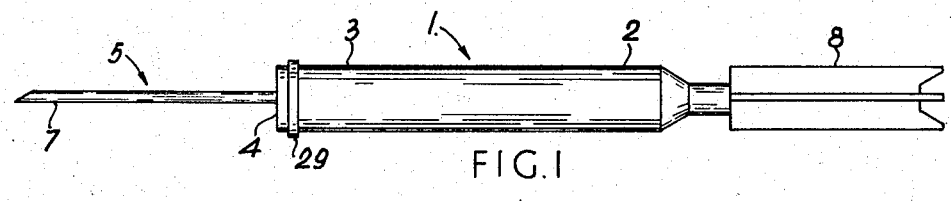
FIGURE 1 is a view in elevation of the projectile.

In a preferred form of this invention, the projectile includes a hollow body generally denoted 1 closed at its rear end 2 and closable at its forward end 3 by a closure means 4, a needle generally denoted 5 secured and fixed to and extending through closure means 4 so that the rearward portion 6 of the needle 5 extends a short distance into the body 1 and forward portion 7 projects outwardly thereof for a distance commensurable with a desired degree of needle penetration into the animal to be dosed, and a flight tail 8 secured to the end of the rear end 2.

The body 1 is preferably of circular cross section to accommodate a cylindrical capsule generally denoted 9 in frictional sliding association with the interior of the body 1. The length of the capsule 9 is less than the distance between the rear of the interior of the body 1 and the end of the rearward portion 6 of the needle 5.

Figure 2:
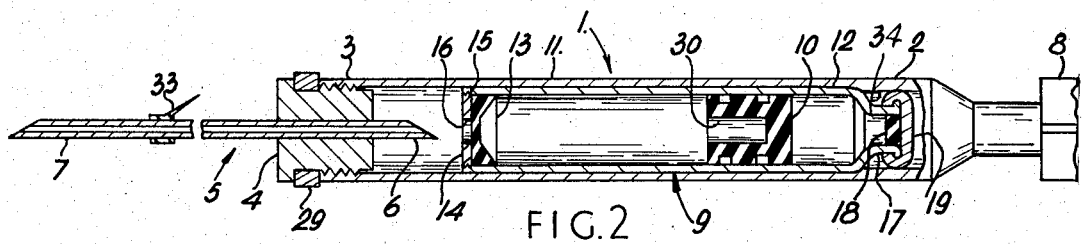
FIGURE 2 is a view partly in elevation and partly in cross section showing one form of the capsule.

In one form of the invention (see FIGURE 2) a piston 10 is accommodated within the capsule 8 for axial movement therewithin dividing the interior of the capsule 9 into anterior and posterior portions 11 and 12 respectively. The anterior portion 11 is adapted to contain liquid medicine and the posterior portion 12 an actuating means.

The actuating means may take any of the forms disclosed in my co-pending United States application Ser. No. 238,448 but is preferably that which employs compressed air.

The end of the anterior portion 11 is closed by a rupturable membrane 13 which is held within the end of the anterior portion by a washer 14 securable within said end by screw threading at 15. The bore 16 of the washer 14 is of such a diameter as to allow the rearward portion of the needle to pass therethrough to rupture the membrane 13.

Rearward end 17 of the capsule is of a reduced diameter and sealed with a resilient bung 18 which may be held in position by a cap 19 securable to the end 17.

In the preparation of this form of the capsule for insertion into the body 1 of the projectile, the piston 10 is inserted into the capsule 9 at its forward end a distance commensurate with a desired quantity of liquid medicine which medicine is then poured into and contained within the anterior portion 11. The resilient membrane 13 is then placed into the end of the anterior portion 11 and secured therein by the washer 14. The actuating means which may be in the form of a gas or a helically wound compression spring may then be placed within the posterior portion 12 and the bung 18 placed in the end 17 and the cap 19 secured thereover.

Where the actuating means is compressed gas or gases the posterior portion 12 may be placed under pressure by the pouring of a liquified gas thereinto, sealing the end 17 by the bung 18 and upon the evaporation of the liquid gas the posterior portion will be placed under pressure. Alternatively the bung 18 may be placed in position and a fine hypodermic needle passed therethrough into the posterior portion 12. Air under pressure may then be admitted through the needle to the posterior portion 12 and when a desired degree of pressure is reached the needle may be withdrawn and the cap 19 secured to the end 17.

Figure 3:
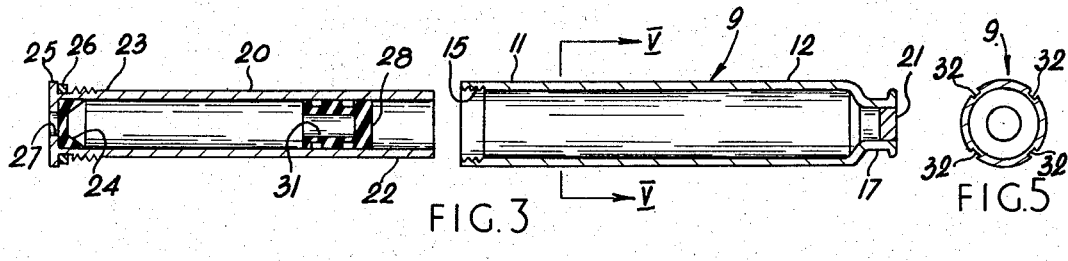
FIGURE 3 is an exploded view in cross section of a second form of the capsule.
Figure 4:
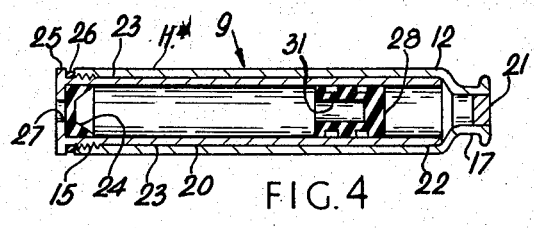
FIGURE 4 is a view in cross section of the second form of the capsule when assembled.

In a second form of this invention (see FIGURES 3 and 4) there is provided an inner member 20 capable of telescopic engagement within the capsule 9.

In this form of the invention the capsule 9 is closed at its end 17 by a stop 21 and open at its forward end. The member 20 is open at its rearward end and 22 closed at its forward end 23 by a rupturable membrane 24 of a similar design to the membrane 13.

The internal diameter of the capsule 9 and the external diameter of the member 20 are substantially identical and their lengths are substantially equal so that the open end 22 may be inserted into the open end of the capsule 9 so that the member 20 may be totally accommodated or almost totally accommodated within the capsule 9. The capsule 9 and member 20 may be secured together by any suitable means such as by the screw-threading at 15.

Preferably the end 23 is provided with a flange or annulus 25 whose diameter does not exceed the diameter of the capsule 9 so that a resilient washer 26 may be accommodated between the forward end of the capsule 9 and said flange 25 to seal the interior of the capsule 9 when the member is secured therewithin. The end 23 is closed save for an axial bore 27 therethrough capable of allowing the rearward portion 6 of the needle 5 to pass therethrough to rupture the membrane 24.

In the assembly of this form of the capsule a desired quantity of liquid medicine is placed within the member 20 and a piston 28 of a similar design to piston 10 inserted thereinto so as to contain the liquid medicine within the forward end 23 thereof, and the member 20 is then inserted into the capsule 9. Due to the close fit between the outer walls of the member 20 and the inner wall of the capsule 9 the insertion of the member 20 into the capsule 9 compresses the air previously contained with said capsule 9 into the space immediately behind the piston 28 thus providing the actuating means in the form of compressed air as hereinbefore referred to. The two body portions may then be secured as before described.

In the assembly of the projectile hypodermic syringe of this invention the capsule 9 containing a suitable class and quantity of liquid medicine is selected and inserted into the body 1 with the rupturable membrane 13 or 24 outermost and the capsule 9 then moved to the rear of the interior of the body 1. The closure means 4 may have placed thereon a gas sealing washer 29 and be secured to forward end 3 of the body 1 to close same. The projectile is then ready for projection with the rupturable membrane of the capsule 9 disposed a short distance from the inwardly extending portion 6 of the needle.

When the projectile (after having been projected) strikes the animal to which the medicine is to be administered, the outwardly extending portion 6 of the needle 5 penetrates the animal and the closure means 4 abuts the skin thereof thereby abruptly halting the flight of the projectile. The capsule 9, due to the residual momentum thereof, moves axially and forwardly within the body 1 thereby causing the membrane 13 or 24 as the case may be, to rupture on the inwardly extending portion 6 of the needle 5. As a consequence the piston 10 under the urging of the actuating means is propelled forward to force the liquid medicine from the capsule 9 through the hollow needle 5 to be injected into the animal.

The crowns of the pistons 10 and 28 may each be provided with a concave depression or an axial bore therein, indicated by the numerals 30 and 31 respectively, extending partly but not all the way therethrough to accommodate that part of the inwardly projecting portion 6 of the needle 5 that has penetrated the capsule 9, thus ensuring that a minimum quantity of liquid medicine is left uninjected.

Figure 5:
FIGURE 5 is a view in cross section looking in the direction of arrows V—V in FIGURE 3 showing a modification of the capsule.

The diameter of the capsule 9 may be such that air may pass between the capsule and the interior wall of the body 1 from the forward to the rearward portions 3 and 2 and vice versa. Alternatively axial grooves 32 may be provided for this purpose in the capsule 9 as shown in FIGURE 5.

To retain the projectile in the animal being dosed a barb 33 may be provided on the needle 5.

The interior of the rear end 2 may have a reduced diameter at 34 to accommodate end 17 and act as a stop against which the capsule 9 may abut. By this construction should the capsule 9 be inserted into the body the wrong way the capsule 9 cannot be inserted far enough to enable the closure means 4 to be secured to the end 3.

What I do claim and desire to obtain by Letters Patent of the United States of America is:

1. A projectile adapted to inject liquid medicine, drugs and the like into animals comprising a hollow body closed at its rear end and a closure means for closing its front end, a hypodermic needle extending axially of and secured to the closure means and having a first portion extending into the body and a second portion projecting from the body, a capsule arranged for accommodation in and capable of axial movement within the body, a piston of resilient material within said capsule capable of movement therein and dividing the capsule into anterior and posterior portions, a rupturable membrane closing the end of said anterior portion with said anterior portion being adapted to be filled with liquid medicine, actuating means within said posterior portion normally urging said piston in the direction of said membrane and maintaining said anterior portion under pressure such that upon penetration of the second portion of the hollow needle into the animal, and the momentum of the capsule causing it to be displaced axially and forwardly of the body thereby causing the first portion of the needle to penetrate and rupture the membrane to provide communication between said anterior portion and the interior of said needle, the actuating means then forces said piston towards the membrane thus expelling the liquid contents of the anterior portion through the needle.

2. A projectile adapted to inject medicine, drugs and the like into animals comprising a hollow body closed at its rear end and a closure means, for closing its front end, a hypodermic needle extending axially of and secured to the closure means having a first portion extending into the body and a second portion projecting from the body, a capsule arranged for accommodation in and capable of axial movement within the body, a piston of resilient material within said capsule and capable of axial movement therein and dividing the capsule into anterior and posterior portions, a rupturable membrane closing the end of said anterior portion with said anterior portion being adapted to be filled with liquid medicine, actuating means in the form of a compressed gaseous medium within said posterior portion normally urging said piston in the direction of said membrane and maintaining said anterior portion under pressure, such that upon penetration of the hollow second portion of the needle into the animal and the momentum of the capsule causing it to be displaced axially of the body thereby causing the first portion needle to penetrate and rupture the membrane to provide communication between said anterior portion and the interior of the needle, the actuating means then forces said piston towards the membrane thus expelling the liquid contents of the anterior portion through the hollow needle.

3. The projectile adapted to inject liquid medicine, drugs and the like into animals as claimed in claim 2 wherein the membrane is held within the end of the anterior portion by a washer securable to said end, the diameter of the hole of said washer being substantially greater than that of the first portion of the needle to enable said rearwardly extending portion of the needle to pass therethrough, the end of the posterior portion being, closable by a bung the arrangement being such that in the preparation of the capsule for insertion into the body the piston is inserted into the capsule, the liquid medicine placed within the anterior portion thereof, the membrane inserted into the end of said anterior portion and the washer secured therein to retain the membrane, with gas under pressure then being admitted to and retained in the posterior portion of the capsule.

4. A projectile adapted to inject liquid medicines, drugs and the like into animals, comprising a hollow body closed at its rear end and a closure means for closing its forward end, a hypodermic needle extending axially of and secured to the closure means and having a first portion extending into the body and a second portion projecting from the body, a capsule arranged for accommodation in the body, said capsule including a posterior tubular portion open at one end and closed at the other end, an inner tubular member mounted within said tubular portion through the open end to have a close tolerance sliding fit within said tubular portion, a rupturable membrane closing one end of said inner member, a piston of resilient material mounted within said inner tubular member, and a liquid medicine contained within said inner tubular member between said piston and membrane, the close tolerance, sliding fit between the inner tubular member and posterior tubular portion compressing the air between the piston and the closed end of the posterior tubular portion for providing an actuating means normally urging the piston towards the membrane and maintaining the medicine under pressure so that upon entry of the needle into an animal and the momentum of the capsule causing the same to be displaced axially of the body, the first portion of the needle enters and ruptures said membrane for providing communication between the interior of the needle and the tubular member between the piston and membrane and the actuating means then forces the piston towards the membrane thus expelling the liquid medicine through the hollow needle.

5. A projectile for injecting liquid medicines, drugs and the like into animals, comprising a hollow body closed at its rear end and a closure means for closing its forward end, a hypodermic needle extending axially of and secured to the closure means and having a first portion extending into the body and a second portion projecting from the body, a capsule having an opening at one end mounted within said body for axial movement, a piston of resilient material within said capsule for axial movement therein and dividing said capsule into anterior and posterior portions, a rupturable membrane closing the opening of said anterior portion, a liquid medicine contained in said anterior portion, actuating means within said posterior portion normally urging said piston towards said membrane and maintaining said anterior portion under pressure, and said piston having a recess facing said membrane of sufficient dimensions to accommodate said first portion of said needle whereby upon entry of said second portion of said needle into an animal and the momentum of the capsule causing the same to be displaced axially and forwardly of the body and the first portion of said needle to rupture the membrane for providing communication between said anterior portion and the interior of the needle, the actuating means then forces the piston towards the membrane thus expelling the medicine through the needle with said first portion of the needle entering the recess of said piston for insuring a minimum amount of medicine remaining uninjected within said anterior portion.

References Cited

UNITED STATES PATENTS

| | | | |
|---|---|---|---|
| 2,100,456 | 11/1937 | Spensley | 128—272 |
| 2,617,359 | 11/1952 | Van Horn et al. | 128—215 |
| 2,679,247 | 5/1954 | Mendez | 128—272 |
| 2,699,167 | 1/1955 | Raiche | 128—216 |
| 2,837,093 | 6/1958 | Tash | 128—218 |

RICHARD A. GAUDET, *Primary Examiner.*

D. L. BAKER, *Assistant Examiner.*